a2
United States Patent
Hommel (10) Patent No.: US 12,337,917 B2
(45) Date of Patent: Jun. 24, 2025

(54) BRAKE DISK LOCK

(71) Applicant: ABUS August Bremicker Söhne KG, Wetter-Volmarstein (DE)

(72) Inventor: Martin Hommel, Rehe (DE)

(73) Assignee: ABUS August Bremicker Söhne KG, Wetter-Volmarstein (DE)

( * ) Notice: Subject to any disclaimer, the term of this patent is extended or adjusted under 35 U.S.C. 154(b) by 304 days.

(21) Appl. No.: 17/835,054

(22) Filed: Jun. 8, 2022

(65) Prior Publication Data

US 2022/0396325 A1 Dec. 15, 2022

(30) Foreign Application Priority Data

Jun. 14, 2021 (DE) .......................... 102021115329.8

(51) Int. Cl.
*B62H 5/18* (2006.01)
*B62H 5/20* (2006.01)

(52) U.S. Cl.
CPC ................. *B62H 5/18* (2013.01); *B62H 5/20* (2013.01)

(58) Field of Classification Search
CPC .. B62H 5/18; B62H 5/20; E05B 15/00; E05B 15/10
See application file for complete search history.

(56) References Cited

U.S. PATENT DOCUMENTS 5,377,511 A 1/1995 Meckbach

FOREIGN PATENT DOCUMENTS

| DE | 29500444 | U1 | 2/1995 | |
|---|---|---|---|---|
| DE | 29500444 | * | 4/1995 | ............... B62H 5/18 |
| DE | 10250961 | A1 | 5/2004 | |
| DE | 102005043926 | A1 | 3/2007 | |
| DE | 102007058550 | A1 | 6/2009 | |
| DE | 102007058551 | A1 | 6/2009 | |
| DE | 102009030031 | A1 | 12/2010 | |
| DE | 102011113771 | A1 | 3/2013 | |
| DE | 102015103170 | A1 | 9/2016 | |
| DE | 102018111287 | A1 | 11/2019 | |
| DE | 102018111305 | A1 | 11/2019 | |
| EP | 0716007 | A1 | 6/1996 | |
| GB | 2451075 | * | 12/2009 | ............. B60R 25/00 |

* cited by examiner

*Primary Examiner* — Michael P Ferguson
*Assistant Examiner* — Thomas L Neubauer
(74) *Attorney, Agent, or Firm* — Dickinson Wright PLLC (57) ABSTRACT

A brake disk lock includes a claw comprising a first claw section and a second claw section movable relative to each other between an open position and a closed position of the claw, wherein, in the closed position, the claw comprises a predetermined clearing width so as to engage around a section of a brake disk of a two-wheeled vehicle. Further, the brake disk lock comprises a locking mechanism which is configured to lock the claw in the closed position, and an adjustment device configured to adjust the predetermined clearing width of the claw to different brake disks.

23 Claims, 4 Drawing Sheets

BRAKE DISK LOCK

CROSS-REFERENCE TO RELATED APPLICATIONS

This application claims the benefit and priority of German Application No. DE 102021115329.8 filed on Jun. 14, 2021. The entire disclosure of the above application is incorporated herein by reference.

FIELD

The present invention relates to a brake disk lock having a claw comprising a first claw section and a second claw section. The first claw section and the second claw section are movable relative to each other between an open position and a closed position of the claw. In the closed position, the claw comprises a predetermined clearing width so as to engage around a section of a brake disk of a two-wheeled vehicle. Further, the brake disk lock comprises a locking mechanism configured to lock the claw in the closed position.

BACKGROUND

A brake disk lock is used to secure a two-wheeler against any unauthorized driving away, in that a brake disk of the two-wheeler is blocked against rotational movement. For this purpose, the brake disk lock may engage in an opening of the brake disk formed at the brake disk for ventilation/cooling purposes or to save weight.

Such a brake disk lock may comprise, for example, a receiving gap in which the brake disk is received, and which is then penetrated by a latch in the transverse direction in order to secure the brake disk lock at the brake disk. The operation of such a brake disk lock can be undesirably cumbersome. In particular, operation with two hands can be necessary when, with the one hand, the receiving gap of the brake disk lock needs to be aligned relative to the brake disk, so that the other hand may operate the locking device such that the latch meets the associated opening of the brake disk. A further disadvantage of known brake disk locks is that the fixed specified depth of the receiving gap may result in an undesired large clearance between the brake disk lock and the brake disk in the closed position, which can lead to an insecure fit of the brake disk lock at the brake disk. A similar problem may arise with ratchet-type brake disk locks, if the user does not close a claw, which latches at varying positions, far enough and thus due to incorrect use leaves an unnecessary large clearance between the claw and the brake disk.

SUMMARY

It is an object of the present invention to produce a brake disk lock that allows a simple and fail-safe operation and ensures a secure fit of the brake disk lock at various brake disks.

This object is achieved by a brake disk lock having the features of claim 1. In particular, the brake disk lock of the present invention includes a claw having a first claw section and a second claw section which are moveable relative to each other between and open position and a closed position. The claw defines a predetermined clearing width when located in the closed position that is configured to engage around a section of a brake disk of a two-wheel vehicle. The brake disk lock further includes a locking mechanism configured to lock the claw in the closed position, and an adjustment device configured to adjust the predetermined width of the claw to different brake disks.

In the brake disk lock according to the invention, in the closed position, the claw comprises a predetermined clearing width in order to engage around a section of a brake disk of a two-wheeler. In this closed position having a predetermined clearing width, the claw can be locked. The brake disk lock further comprises an adjustment device configured to adjust the predetermined clearing width of the claw to different brake disks.

The relevant section of the brake disk can be embraced by the claw in that one of the two claw sections engages in an opening of the brake disk and the other of the two claw sections engages around an outer circumference of the brake disk or engages in another opening of the brake disk. In the closed position, the claw thus forms a receiving space for the relevant section of the brake disk. In this regard, said clearing width of the claw designates the effective inner dimension of the claw in its closed position. The clearing width of the claw should generally correspond as closely as possible to the extent of the embraced section of the brake disk, i.e. the claw should be mounted to the section of the brake disk with a small amount of clearance, so that the brake disk lock fits securely at the brake disk.

To this end, the clearing width with which the claw effectively limits the receiving space for the brake disk in the closed position is adjustable, i.e. the clearing width is predetermined for a subsequent use of the brake disk lock and is maintained for the subsequent use. By means of the adjustment device, the clearing width of the claw for the subsequent use of the brake disk lock may thus be adjusted to the dimensions of a particular brake disk—in particular to the extent of the embraced section of the brake disk. This adjusting of the predetermined clearing width of the claw thus relates to the subsequent repeated locking of the brake disk lock at the brake disk in question and releasing from this brake disk.

Due to the construction of the brake disk lock, it is in particular possible to use the brake disk lock for various vehicles having at least two wheels, such as e.g., a motorcycle, a scooter, an e-bike, a cargo bike, a bicycle, a trike, a quad bike and the like. Due to the adjustability of the predetermined clearing width of the claw, it can in particular be prevented that the brake disk lock can be released from the brake disk, even by a slight bending up, for example, because the ends of the two claw sections are too far apart. Furthermore, it can be prevented or at least made more difficult for a prying tool (e.g. for levering) to be inserted into a gap between the brake disk and the brake disk lock as a result of too large a clearance.

An advantage of the invention also lies in an easy and fail-safe operation. The predetermined clearing width of the claw is always maintained, since locking only occurs in the closed position of the claw. Thus, a reliable mounting of the claw to the brake disk is ensured by a sufficient embracement in the closed position with little clearance, without the user having to ensure that the claw is always closed with the maximum possible lift. Due to the claw shape, the brake disk lock may be hung to the brake disk in the open position. This means that a one-handed operation is possible, as the brake disk lock does not have to be held and aligned relative to the brake disk for locking.

Further embodiments of the invention are described below and in the dependent claims.

In some embodiments, the locking mechanism may be fixedly connected to the first claw section, at least when the brake disk lock is in a state of use. The second claw section may be movable relative to the first claw section and to the locking mechanism, in order to move the claw between the open position and the closed position. In some embodiments, the brake disk lock may further comprise a lock body in which the locking mechanism is held and at which the second claw section is movably supported. In this respect, the first claw section may also be referred to as the holding section and the second claw section may be referred to as the locking section.

In some embodiments, the first claw section and the second claw section may be movable linearly, i.e., in a straight line, relative to each other between the open position and the closed position.

In some embodiments, the first claw section and the second claw section may comprise a respective hook structure to engage around the section of the brake disk. The claw may in particular be configured substantially C-shaped.

In order to allow adjustment of the predetermined clearing width of the claw, various possibilities are available, as will be explained below.

In some embodiments, at least one of the claw sections may comprise a hook structure configured to engage around the section of the brake disk, and which occupies an effective distance from the locking mechanism (and thus, in particular, from a lock body of the brake disk lock) when the claw is closed and locked. The adjustment device may be configured to adjust the effective distance of the hook structure to the locking mechanism or to the lock body. Said effective distance may in particular be related to the direction of movement of the claw. In such embodiments, in particular a mounting position of said holding section of the claw may be adjustable or said holding section or said locking section of the claw may be adjustable in length.

In some embodiments, in a state of use of the brake disk lock, the first claw section may be mounted in an adjustable fixed mounting position relative to the locking mechanism. The adjustment device may be configured to adjust the mounting position of the first claw section relative to the locking mechanism. This mounting position may be a position that the first claw section occupies at the locking mechanism during subsequent use of the brake disk lock for repeated locking at the relevant brake disk and release from the brake disk and maintains during use, in particular, also during movement of the claw between the open position and the closed position.

In such an embodiment, the brake disk lock may comprise a holder which supports the locking mechanism, wherein the first claw section may be mounted at the holder. In particular, the holder may be formed by said lock body.

In some embodiments, the adjustment device may be configured to adjust the predetermined clearing width of the claw based on a form-fitting connection between two components of the brake disk lock (e.g. between a claw section and the locking mechanism, or between two claw sections) according to a predetermined engagement pitch. Due to a form-fit, a particularly high level of security of the adjustable connection against any attempts to break it open is achieved. A predetermined engagement pitch of the form-fitting connection simplifies the adjustment of the clearing width by the user.

In one such possible embodiment, the adjustment device may comprise an engagement contour (e.g., serration) associated with the locking mechanism and an engagement counter-contour (e.g., counter-serration) associated with the first claw section. The engagement contour and the engagement counter-contour can be brought into engagement with each other at different mounting positions and may be securable to each other at the respective mounting position. The different mounting positions may therefore serve to adjust the predetermined clearing width of the claw in the closed position for the subsequent use of the brake disk lock. Said engagement contour does not need to be formed directly at the locking mechanism, but may, for example, be provided at said holder or at said lock body of the brake disk lock. The engagement contour and the engagement counter-contour may comprise a plurality of teeth which, for example, are tapered, in particular sawtooth-shaped, or rectangular in cross-section, wherein an incremental adjustment is possible. The securing at the respective mounting position may take place, in particular, by means of a securing element, which is described in more detail below.

As an alternative to an engagement contour in the form of a serration and an engagement counter-contour in the form of a counter-serration, the adjustment device may, for example, comprise a row of holes for screw fastenings according to a predetermined engagement pitch, wherein, for example, a threaded hole can be brought into alignment with one of a plurality of through-openings, or a through-opening can be brought into alignment with one of a plurality of threaded holes, and wherein the respective threaded hole on the one hand, and the respective through-opening on the other hand, are associated with the locking mechanism or the first claw section, or vice versa.

In such embodiments having an adjustable fixed mounting position of the first claw section, the first claw section may be rigidly formed and/or have a fixed length. The first claw section may in particular correspond to said holding section of the claw.

In other embodiments for adjusting the predetermined clearing width of the claw, the at least one claw section comprising the hook structure may comprise a locking structure, with which the locking mechanism engages when the claw is closed and locked. The adjustment device may be configured to adjust an effective length between the hook structure and the locking structure of the claw section. In this embodiment, the claw section in question may be movable relative to the other claw section and/or to the locking mechanism (or lock body), in order to move the claw between the open position and the closed position. The claw section in question may thus correspond in particular to said locking section of the claw, which in this embodiment is adjustable in length.

In other embodiments for adjusting the predetermined clearing width of the claw, the brake disk lock may comprise a holder which supports the locking mechanism, wherein the at least one claw section comprising the hook structure has a connecting end at which the claw section is connected to the holder in a fixed position (integrally formed as one piece or permanently connected in multiple pieces). The adjustment device may be configured to adjust an effective length between the hook structure and the connecting end of the claw section. The holder may be formed in particular by said lock body. In this embodiment, the claw section in question may be arranged to be immovable when the claw is moved between the open position and the closed position. The claw section in question may correspond in particular to said holding section of the claw, which in this embodiment is adjustable in length.

In such embodiments with a length-adjustable (first or second) claw section, the adjustment device may, for example, comprise a threaded rod and an internal thread that is displaceable along the threaded rod, by which the effective length of the at least one claw section is adjustable. The effective length may take place by turning in small increments the threaded rod and the internal thread relative to each other. The threaded rod may be connected to the hook structure and the internal thread may be connected to the locking structure or the mounting end of the claw section, or vice versa. The adjustment device (with threaded rod and internal thread) may thus be part of the length-adjustable claw section.

In some embodiments, the brake disk lock may be configured such that the adjustment device may only be actuated as a result of unlocking the locking mechanism, in order to adjust the predetermined clearing width of the claw to different brake disks. Thus, it is first necessary for the authorized user to unlock the brake disk lock or the locking mechanism by means of an associated identification means (e.g., by means of a key, or by entering or transmitting a code, in particular by radio). Only after successful unlocking of the brake disk lock may the adjustment device be actuated, for example, in that the adjustment device is at all accessible only when the claw is in the open position or when the brake disk lock is released from the brake disk, as will be explained below. By doing so, it is prevented that the brake disk lock may be released from the brake disk by manipulating the adjustment device.

In some embodiments, the adjustment device may include a securing element configured to secure an adjustment (i.e., an adjusted value) of the predetermined clearing width of the claw. The securing element may be covered by the brake disk or by a part of the brake disk lock, and/or the securing element may be blocked against movement when the brake disk lock is mounted at the brake disk and when the claw is closed and locked. The securing element may comprise, for example, at least one screw or nut that secures a position of another element of the adjustment device, wherein the screw or nut is secured against any displacement by the claw itself when the claw is in the closed position. Alternatively, the securing element may, for example, be a metal pin secured against displacement.

In some embodiments, the claw may be biased towards the open position. The bias may be achieved by a coil spring, a torsion spring, or a wave spring. Due to such a bias, the claw may automatically move to the open position after unlocking, so that it is easy for the user to recognize when the claw is in the open position. Furthermore, the bias ensures that the open position taken is stable. This simplifies the applying of the brake disk lock to the brake disk (in particular the explained mounting) and/or a one-hand operation.

In some embodiments, the locking mechanism may comprise a latch, that in a locking position, when the claw is closed, locks the second claw section to the first claw section and, in a release position, releases the second claw section for movement relative to the first claw section. The locking mechanism may comprise a locking cylinder to actuate the latch.

In such an embodiment, the latch may be biased toward the locking position, wherein the latch is configured to be first urged back towards the release position by movement of the claw from the open position to the closed position and then to snap into the locking position due to the bias. The biasing of the latch may take place, for example, by a spiral or torsion spring which engages the latch with one end and with the other end is supported at a housing of the locking mechanism and/or at said lock body. Due to the bias, an automatic function of the locking of the brake disk lock is achieved, so that a locking of the lock of the locking cylinder does not have to be operated manually. This in turn simplifies the aforementioned one-hand operation of the brake disk lock.

In such an embodiment with automatic locking, the latch may be rotatably mounted and have a peripheral surface with a tangential recess, wherein the recess releases a locking protrusion of the second claw section in the release position of the latch. The latch may thus be configured as a rotational latch which, for example, is rotatably mounted at a peripheral surface of the locking cylinder. The axis of rotation of the rotational latch may coincide with an axis of rotation of the locking cylinder.

As an alternative to a purely mechanical locking mechanism (with locking cylinder), an electromechanical locking mechanism may also be provided, for example, with an electric motor or electromagnet as an electrically controllable actuator.

In order to simplify single-handed operation of the brake disk lock, at least one of the claw sections, in particular the first claw section, may be configured to engage in an opening of the brake disk and thereby hold the brake disk lock suspended at the brake disk. Thus, also in the open position of the claw, the brake disk lock may be arranged to hang freely at the brake disk without the user having to hold and position the brake disk lock with one hand, so as to be able to actuate the locking mechanism with the other hand. For this, the hook structure already mentioned may in particular be formed at the claw section in question.

In some embodiments, the brake disk lock may comprise an alarm device for outputting an alarm signal, wherein the alarm device is configured to be activated by moving the claw to the closed position and is deactivated by moving the claw from the closed position to the open position. Thus, it can be achieved that the alarm device is automatically activated and deactivated when the user moves the claw between the closed position and the open position, in particular, as a result of an unlocking operation of the locking mechanism.

The alarm device may include a motion sensor that detects changes in position and/or accelerations or changes in acceleration, which, for example, trigger the output of an alarm signal when a threshold value is exceeded. The acceleration sensor may also output an acoustic alarm signal as a reminder to the authorized user against forgetting to release the brake disk lock from the brake disk when the user moves the two-wheeler. Furthermore, when the alarm device is activated, a short activation tone may sound to acoustically confirm the activation of the alarm function.

In some embodiments, the alarm device may comprise an activation switch which is configured to be automatically actuated by the second claw section or by a part of the brake disk lock connected to the second claw section when the claw is in the closed position. In particular, the activation switch may be configured as a contact switch. Activation of the alarm device may be triggered, for example, by interacting actuating bevels on the second claw section and on the alarm device. In the open position of the claw, if the activation switch is no longer actuated, this can thereby trigger deactivation of the alarm device.

The evaluation of the signals of said motion sensor and/or said activation switch can be carried out by a control circuit of the alarm device.

In such an embodiment, the alarm device may be arranged in a housing section of the brake disk lock, which is fixedly connected to the first claw section, wherein the alarm device is accessible only as a result of unlocking the locking mechanism. This ensures that the alarm device is accessible (for example, for battery replacement) only to the authorized user who has the identification means (e.g., key) associated with the locking mechanism.

In particular, the housing section of the brake disk lock may include an access opening through which the alarm device is accessible. For example, the brake disk lock may be configured such that in the closed position of the claw, the access opening is covered by the second claw section. In contrast, in the open position of the claw, the access opening may be exposed for access. In other embodiments, the access opening may be covered, for example, by a cover that can only be opened when the brake disk lock is in the unlocked state. Through this, an inherent protection of the alarm device against any attempts to tamper with it is assured.

In some embodiments having an additional securing function, the brake disk lock may comprise a first securing section associated with the first claw section and a second securing section associated with the second claw section. In the open position of the claw, the first securing section and the second securing section may form a receiving opening for the insertion of an eyelet of a flexible securing member, in particular, a chain. In the closed position of the claw, the first securing section and the second securing section may form a circumferentially closed boundary of the receiving opening, in order to secure the inserted eyelet at the brake disk lock. For example, one of the two securing sections may be formed by a part of a lock body of the brake disk lock. The brake disk lock may thus serve to not only block a brake disk of the two-wheeler, but also to fix the two-wheeler to a surrounding object and/or to secure other objects (e.g. helmet) to the two-wheeler.

DRAWINGS

The invention is explained below by way of example only, with reference to the drawings.

DESCRIPTION

Figure 1A:
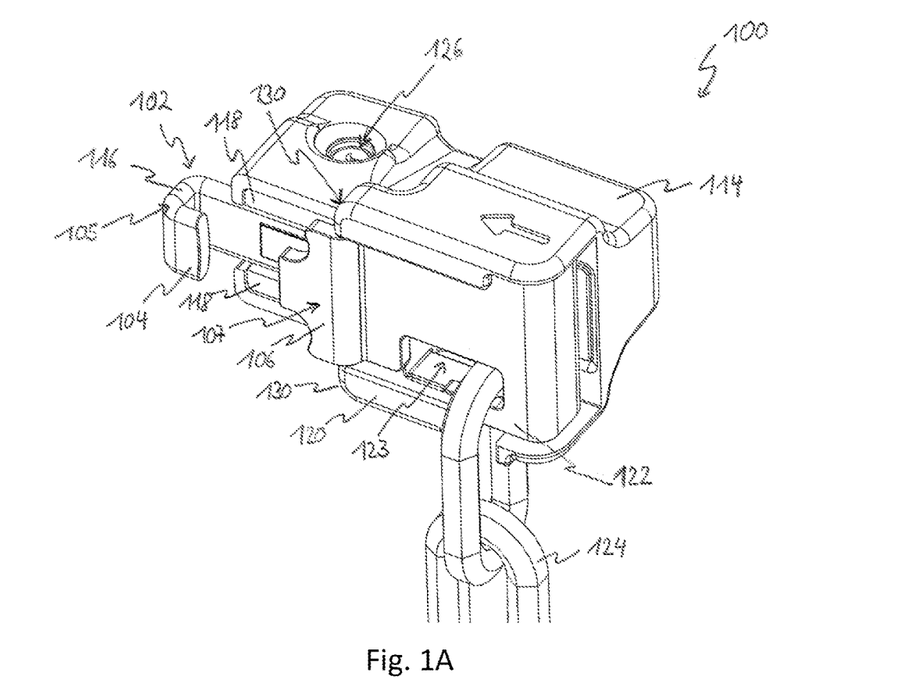
FIG. 1A shows a perspective view of a brake disk lock in a closed position.

FIG. 1A shows a perspective view of the rear side of a brake disk lock 100 in a closed position. The brake disk lock 100 comprises a lock body 114 and a claw 102 having a first claw section 104 and a second claw section 106. As will be further explained below, in a state of use of the brake disk lock 100, the first claw section 104 is immovably held at the lock body 114, and the second claw section 106 is movably guided at the lock body 114 and is lockable in the closed position of the claw 102. The first claw section 104 and the second claw section 106 form a respective hook structure 105 and 107 at their free ends. The lock body 114 may be formed by a metal casting (e.g., zinc die-casting). The first claw section 104 and the second claw section 106 may be formed by stamped and bent metal parts.

The brake disk lock 100 includes a first securing section 120 associated with the first claw section 104 and formed by a part of the lock body 114, and a second securing section 122 formed by a part of the second claw section 106. In the open position of the claw 102, the first securing section 120 and the second securing section 122 form a receiving opening 123 for the insertion of an eyelet of a flexible securing member 124. In the closed position of the claw 102, the first securing section 120 and the second securing section 122 form a circumferentially closed boundary of the receiving opening 123 to secure the inserted eyelet at the brake disk lock 100.

Figure 1B:
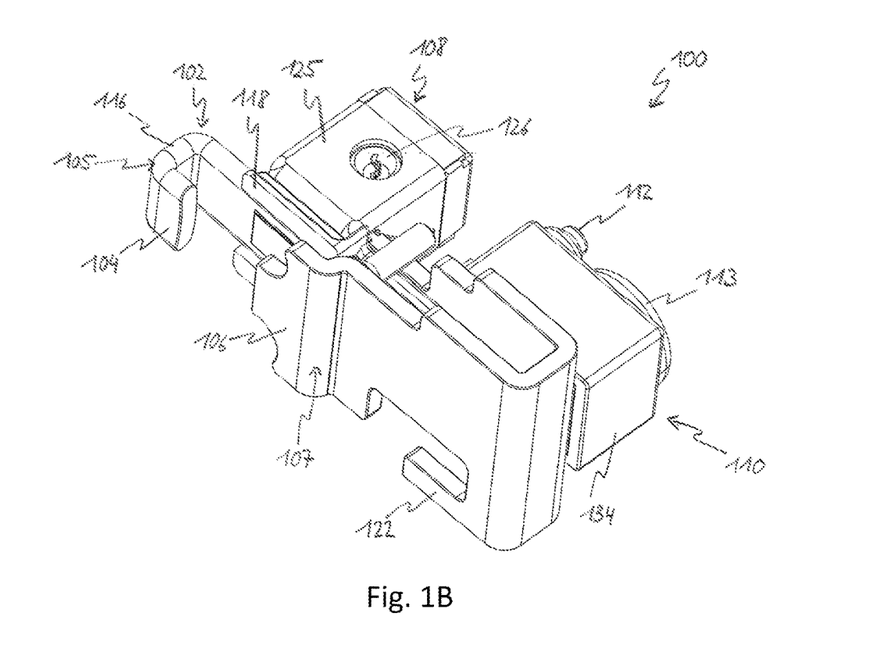
FIG. 1B shows a perspective view of the brake disk lock in the closed position without a lock body.

FIG. 1B shows a perspective view of the brake disk lock 100 in the closed position of the claw 102 without the lock body 114. The brake disk lock 100 includes a locking mechanism 108 comprising a locking cylinder 126 within a two-part cylinder housing 125 and configured to lock the claw 102 in the closed position. For this purpose, the locking mechanism 108 comprises a rotational latch 202, as will be explained further in connection with FIGS. 2A and 2B. The locking mechanism 108 is arranged within the lock body 114, which in this respect serves as a holder for holding the locking mechanism 108 as well as the first claw section 104 and for supporting the movable second claw section 106.

The brake disk lock 100 further includes an alarm device 110 arranged in a housing section 132 (FIG. 1C) of the brake disk lock 100. The alarm device 110 comprises a housing 134, an activation switch 112, a motion sensor (not shown), a control circuit (not shown), and an acoustic signal generator 113 (FIG. 1B).

Figure 1C:
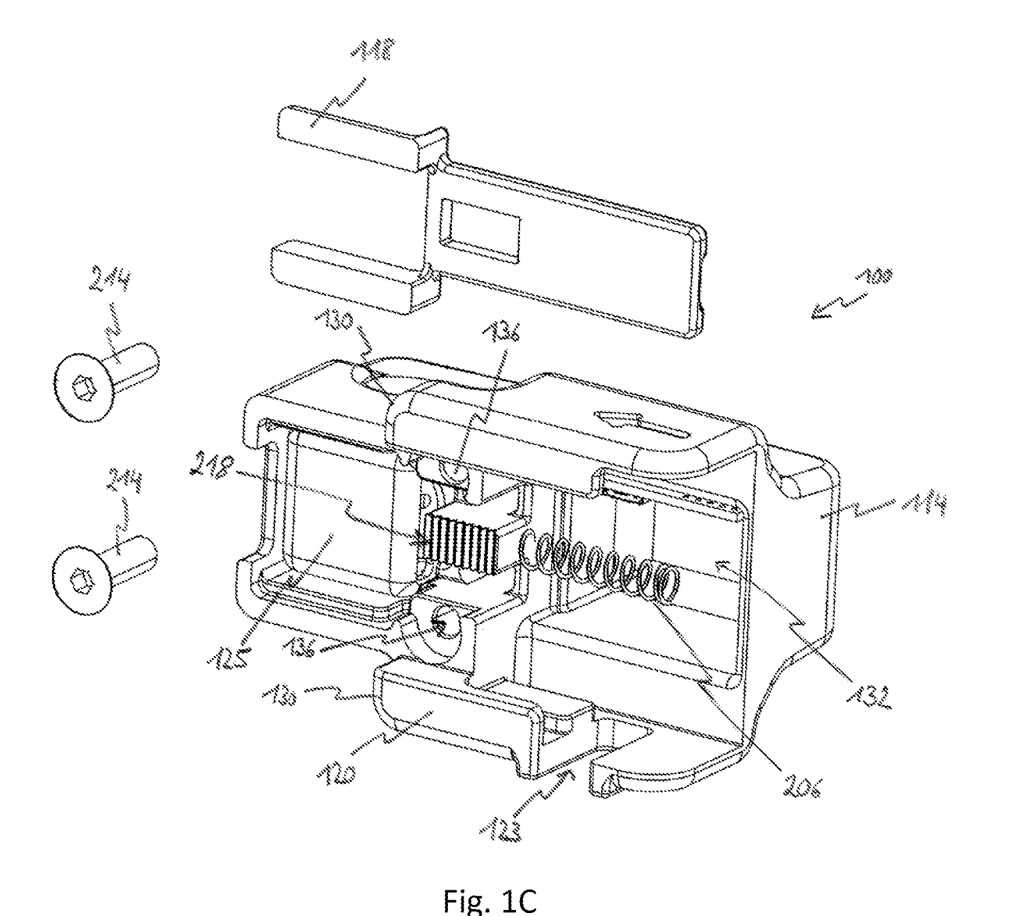
FIG. 1C shows parts of a brake disk lock in a perspective sectional view.

Further, a cover 118 is configured to cover the open rear side of the lock body 114 and thus the locking mechanism 108 and the alarm device 110. In FIG. 1C, the cover 118 is shown removed from its original position.

In an open position of the claw 102, the brake disk lock 100 may be mounted to a brake disk of a two-wheeled vehicle (not shown) by inserting the hook structure 105 of the first claw section 104 in an opening of the brake disk so as to engage around a section of the brake disk. For this purpose, the brake disk lock 100 is arranged in a plane parallel to the plane of extent of the brake disk, so that when releasing the brake disk lock 100, the brake disk is supported at a first supporting point 116 of the first claw section 104 and at a second supporting point 130 of the lock body 114. By moving the claw 102 from the open position to the closed position shown in FIGS. 1A and 1B, the brake disk lock 100 is locked and secured at the brake disk. This is done by moving the second claw section 106 of the claw 102 in the direction of the first claw section 104 and the lock body 114, as will be explained in more detail below.

Figure 2A:
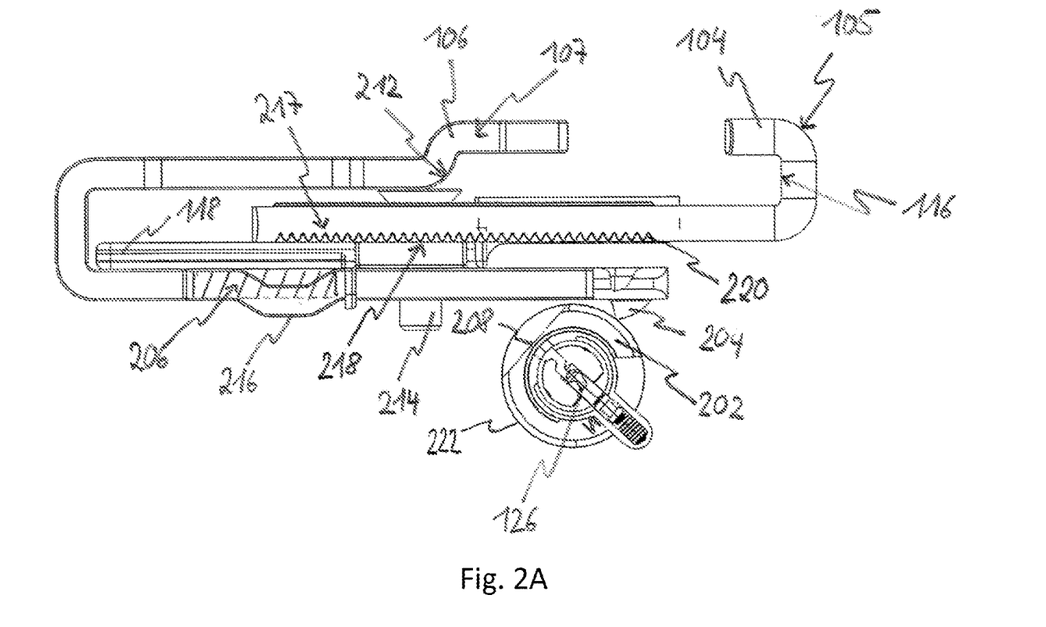
FIG. 2A shows a sectional view of parts of a brake disk lock in a top view of the brake disk lock in the closed position.
Figure 2B:
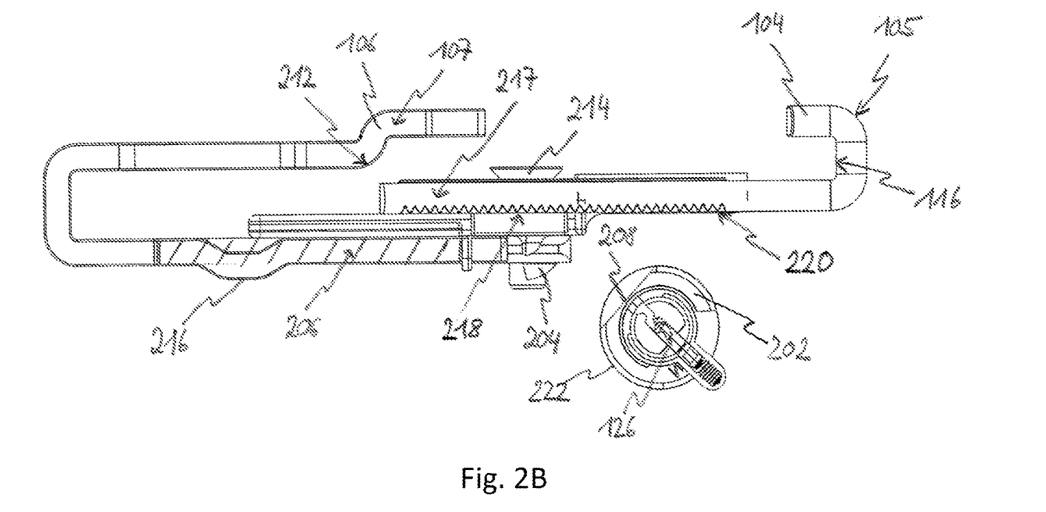
FIG. 2B shows a sectional view corresponding to FIG. 2A in an open position.

FIG. 2A and FIG. 2B show a sectional view of parts of the brake disk lock 100 (excluding the lock body 114) in a top view in the closed position and in the open position, respectively. The claw sections 104, 106 are movable relative to each other between an open position and a closed position of the claw 102. In the closed position shown in FIG. 2A, the claw 102 has a predetermined clearing width for engaging around a section of a brake disk of a two-wheeled vehicle. The clearing width of the claw 102 denotes the internal dimension of the claw 102 in its closed position, in particular the distance between the first supporting point 116 of the first claw section 104 on the one hand and the second supporting point 130 of the lock body 114 and a third supporting point 212 of the second claw section 106 on the other hand. In this example embodiment, in the closed position of the claw 102, the second supporting point 130 of the lock body 114 (FIG. 1A) and the third supporting point 212 of the second claw section 106 (FIG. 2A) are arranged at approximately the same height. However, in connection with the invention, the clearing width of the claw 102 may also generally refer to the inner dimension or the distance between the ends of the two claw sections 104, 106.

In a state of use of the brake disk lock 100, the first claw section 104 of the claw 102 is mounted in an adjustable fixed mounting position relative to the lock body 114 and thus relative to the locking mechanism 108 and the aforementioned rotational latch 202. An adjustment device 217 of the brake disk lock 100 is configured to be able to adjust the mounting position of the first claw section 104 relative to the locking mechanism 108 for different brake disks. The adjustment device 217 may be configured to have an engagement contour associated with the lock body 114 or the locking mechanism 108 in the form of serrations 218 and an engagement counter-contour associated with the first claw section 104 in the form of counter-serrations 220. The serrations 218 and the counter-serrations 220 may be brought into engagement with each other in various mounting positions and secured to each other. The serrations 218 associated with the locking mechanism 108 may be mounted at the side of the lock body 114 facing the first claw section 104. The counter-serrations 220 associated with the first claw section 104 may be mounted at the side of the first claw section 104 facing the lock body 114. The serrations 218 and the counter-serrations 220 may be secured to each other by a securing element, configured here for example as two securing screws 214, in order to fix the mounting position of the first claw section 104.

The adjustment device 217 is thus configured to adjust the predetermined clearing width of the claw 102 to different brake disks. For this purpose, the securing screws 214 may be loosened in the open position of the claw 102 (FIG. 2B) so that the mutual engagement of the serrations 218 and the counter-serrations 220 may be released. The clearing width of the claw 102 may be adjusted by moving the first claw section 104 to a desired position. Once the desired position is reached, the serrations 218 and the counter-serrations 220 may be brought into engagement again and secured to each other by means of the securing screws 214.

In FIG. 1C, the two securing screws 214 are shown disengaged from their original position. To secure the serrations 218 and the counter-serrations 220, the securing screws 214 are each inserted into a threaded hole 136 of the lock body 114 once the serrations 218 and the counter-serrations 220 are engaged in the desired mounting position of the first claw section 104. By rotating the securing screws 214 clockwise, the first claw section 104 and thus the counter-serrations 220 are pressed against the serrations 218 and secured against each other.

The thus adjusted mounting position of the first claw section 104 is a position that the first claw section 104 occupies for the subsequent use of the brake disk lock 100 for the repeated locking to and releasing from the brake disk in question relative to the lock body 114 and thus relative to the locking mechanism 108, and maintains during use, in particular, also during movement of the claw 102 between the open position and the closed position.

In the following, the operation of the locking mechanism 108 will be explained in more detail. The rotational latch 202, which is operable by means of the locking cylinder 126, is configured to lock the claw 102 in the closed position (FIG. 2A). The rotational latch 202 is biased in the direction of its locking position, for example by a torsion spring (not shown). In the representation according to FIGS. 2A and 2B, the bias is oriented counter-clockwise. The rotational latch 202 is rotatably mounted at a peripheral surface 222 of the locking cylinder 126, wherein the axis of rotation of the rotational latch 202 and the axis of rotation of the locking cylinder 126 coincide. The rotational latch 202 comprises a tangential recess 208 at an outer cylindrical peripheral surface 222.

By moving the claw 102, in particular the second claw section 106, from the open position to the closed position, the biased rotational latch 202 is temporarily urged back towards a release position by a locking structure in the form of a locking protrusion 204 of the second claw section 106. For this purpose, the locking protrusion 204 engages a boundary of the tangential recess 208 of the rotational latch 202. Once the locking protrusion 204 has urged the rotational latch 202 back towards the release position to such an extent that the tangential recess 208 runs approximately parallel to the direction of movement of the locking protrusion 204, further displacement of the locking protrusion 204 towards the release position releases the contact between the locking protrusion 204 and the boundary of the tangential recess 208 and the rotational latch 202 can snap back into the locking position due to its bias. The claw 102, in particular the second claw section 106, is thus locked in the closed position, since the locking protrusion 204 is now prevented by the rotational latch 202 from retracting towards the open position. Only by unlocking the locking mechanism 108 by operation of the locking cylinder 126 with an associated key, i.e. moving the rotational latch 202 from the locked position to the release position, is the path of movement of the locking protrusion 204 towards the open position of the claw 102 released, in that the tangential recess 208 is oriented in the release position of the rotational latch 202 with an axis parallel to the direction of movement of the locking protrusion 204.

The brake disk lock 100 comprises a return spring 206 in the form of a coil spring mounted between the second claw section 106 and the cover 118. When the brake disk lock 100 or claw 102 is closed, the return spring 206 becomes biased when moving the second claw section 106 towards the first claw section 104. When the brake disk lock 100 is unlocked by actuation of the locking cylinder 126 by means of the associated key, the second claw section 106 is urged by the return spring 206 from the closed position to the open position of the claw 102.

The alarm device 110 of the brake disk lock 100 may be activated when moving the claw 102 from the open position to the closed position and deactivated when moving the claw 102 from the closed position to the open position. For this purpose, an activation protrusion 216 of the second claw section 106 may actuate the activation switch 112 of the alarm device 110 which is configured as a contact switch, as soon as the claw 102 is brought from the open position to the closed position. The activation protrusion 216 may actuate the activation switch 112 directly or indirectly. In the case of indirect actuation, as is provided in the embodiment shown, the activation protrusion 216 may press a movable housing 134 of the alarm device 110 against the lock body 114 and thereby actuate the activation switch 112 of the alarm device 110. As long as the claw 102 is in the closed position, the alarm device 110 is activated.

As described, by unlocking the brake disk lock 100, the second claw section 106 is urged back to the open position of the claw 102 by the return spring 206. As a result, the activation switch 112 of the alarm device 110 is deactivated. This may take place either, in the case of direct actuation, by releasing the activation protrusion 216 from the activation switch 112, or, in the case of indirect actuation as shown, by urging back the second claw section 106 and thus the activation protrusion 216 to the open position of the claw 102, the housing 134 of the alarm device 110 may yield back again to its original position. As a result, the housing 134 of the alarm device 110 is not pressed further against the lock body 114 and the activation switch 112 is deactivated. The resetting of the housing 134 of the alarm device 110 may take place due to a restoring force, which arises, for example, by the compression of a silicone layer between the housing 134 of the alarm device 110 and the lock body 114 based on the contact pressure force from the activation protrusion 216.

Figure 3:
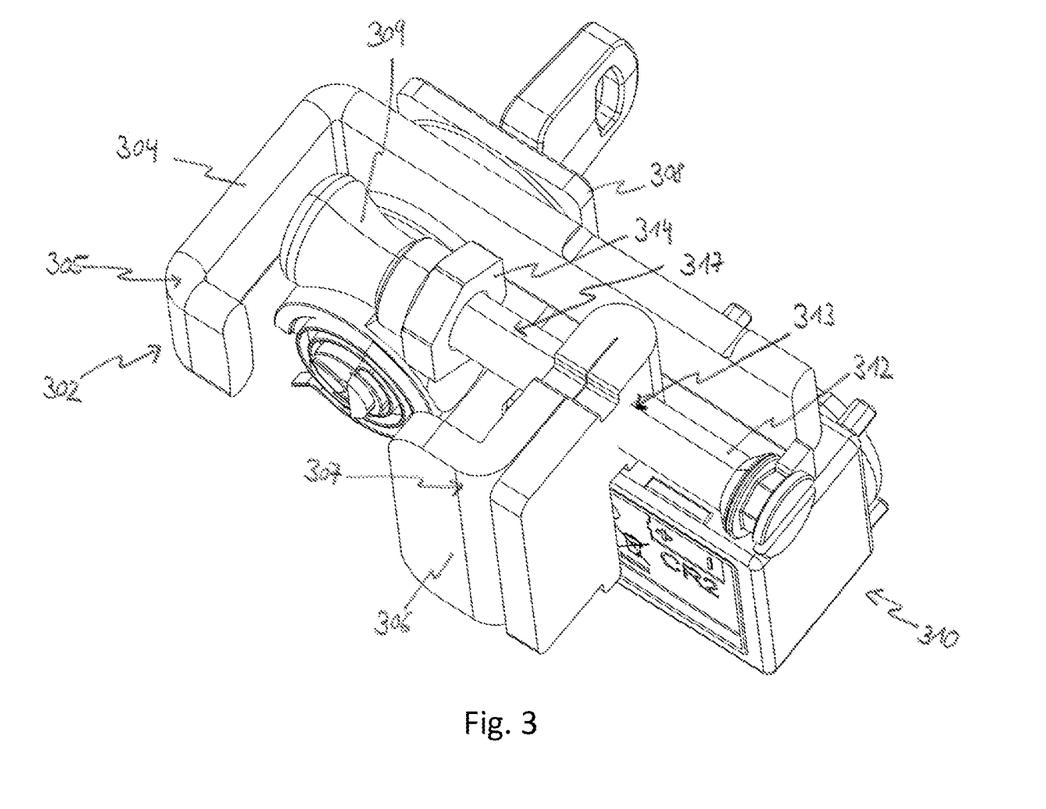
FIG. 3 shows a perspective view of parts of an alternative embodiment of a brake disk lock with a threaded rod.

FIG. 3 shows a perspective view of an alternative embodiment of a brake disk lock 100 having a first claw section 304 and a second claw section 306 of a claw 302; further having a locking mechanism 308 and an alarm device 310. The first claw section 304 comprises a hook structure 305 and is fixedly connected to the locking mechanism 308. The second claw section 306 comprises a hook structure 307 at the one end and a threaded rod 312 with a locking structure 309 at the other end, which forms a block-like thickening. The locking structure 309 of the second claw section 306 may be locked by the locking mechanism 308 when the claw 302 is in the closed position shown, similar to what is explained in connection with FIGS. 2A and 2B. An adjustment device 317 comprises the threaded rod 312 and an internal thread 313 of the hook structure 307 of the second claw section 306, which is displaceable along the threaded rod 312. The adjustment device 317 allows the effective length of the second claw section 306 to be adapted to the dimensions of different brake disks. The position of the hook structure 307 at the threaded rod 312, and thus the effective length of the second claw section 306, may be secured by means of a securing element 314, configured here as a nut. For this purpose, the securing element 314 is secured by a form-fit against rotation in the closed position of the brake disk lock 100, in that the securing element 314 is received in a form-fitting manner in the lock body (not shown in FIG. 3). In the open position of the brake disk lock 100, the form-fit of the securing element 314 is released, and the effective length of the second claw section 306 may be adjusted by rotating the threaded rod 312 in small increments (depending on the pitch of the thread).

The invention claimed is:

1. A brake disk lock, comprising:
a first claw piece and a second claw piece, wherein the second claw piece moves in a linear direction relative to the first claw to adjust through an initial fixedly set movement range between an open position and a closed position, wherein the closed position in the initial fixedly set movement range defines an initial closed predetermined clearing width measured in the linear direction through a space defined between the first claw piece and the second claw piece to engage around a section of a brake disk of a two-wheeled vehicle, and wherein the open position in the initial fixedly set movement range defines an initial open clearing width measured in the linear direction through the space defined between the first claw piece and the second claw piece to release the section of the brake disc;
a locking mechanism that locks the first claw piece and the second claw piece relative to each other in the closed position and prevents movement of the first claw piece relative to the second claw piece along the first linear direction; and
an adjustable range setting mechanism that sets a second fixedly set movement range that is different than the initial fixedly set movement range, wherein the second claw piece moves in the linear direction relative to the first claw piece through the second fixedly set movement range between a closed position and an open position,
wherein the closed position in the second fixedly set movement range defines a second closed predetermined clearing width measured in the linear direction through the space defined between the first claw piece and the second claw piece to engage around a section of a brake disk of a two-wheeled vehicle, and wherein the open position in the second fixedly set movement range defines a second open clearing width measured in the linear direction through the space defined between the first claw and the second claw piece to release the section of the brake disc;
wherein the adjustable range setting mechanism alters the space between the first claw piece and the second claw piece in the closed position to accommodate different brake disks having different dimensions and to define the different initial and second fixedly set movement ranges,
wherein the adjustable range setting mechanism selectively fixes the first claw piece or the second claw piece in a selected one of a plurality of fixed adjustment positions relative to the locking mechanism to define the initial fixedly set movement range and the initial closed predetermined clearing width or the second fixedly set movement range and the second closed predetermined clearing width for subsequent repeated mounting and locking of the brake disc lock at the brake disc,
wherein the first and second claw pieces are repeatedly moveable from the initial or second open position having the first or second fixed predetermined open clearing width to the first or second closed position having the first or second fixed predetermined closed clearing width and,
wherein the fixed predetermined closed clearing width is dependent on the selected fixed adjustment position of the first claw piece or the second claw piece relative to the locking mechanism.

2. The brake disk lock according to claim 1, wherein the locking mechanism is fixedly connected to the first claw piece, and wherein the second claw piece is movable relative to the first claw piece and to the locking mechanism.

3. The brake disk lock according to claim 1, wherein the brake disk lock comprises a lock body in which the locking mechanism is held and wherein the second claw piece is moveable relative to the lock body.

4. The brake disk lock according to claim 1, wherein the first claw piece or the second claw piece includes a hook structure which is configured to engage around the section of the brake disk, and which is held at a first distance from the locking mechanism when the claw is closed and locked, and wherein the adjustable range setting mechanism is configured to adjust the first distance at which the hook structure is held relative to the locking mechanism when the claw pieces are closed and locked.

5. The brake disk lock according to claim 4, wherein the first or second claw piece comprises a locking structure with which the locking mechanism engages when the first and second claw pieces are closed and locked, and wherein the adjustable range setting mechanism is configured to adjust an effective length between the hook structure and the locking structure.

6. The brake disk lock according to claim 5, wherein the adjustable range setting mechanism comprises a threaded rod and an internal thread displaceable along the threaded rod, by means of which the effective length of the first or second claw piece is adjustable.

7. The brake disk lock according to claim 4, wherein the brake disk lock comprises a holder which supports the locking mechanism, wherein the first or second claw piece comprises a connecting end at which the first or second claw piece is connected to the holder in an unchanging position, and wherein the adjustable range setting mechanism is configured to adjust an effective length between the hook structure and the connecting end of the at least one claw piece.

8. The brake disk lock according to claim 1, wherein, in a first state of use of the brake disk lock, the first claw piece is mounted in a first fixed mounting position relative to the locking mechanism, wherein the second claw piece is moveable from the open position to the closed positon while the first claw piece is mounted in the first fixed mounting position, and wherein the adjustable range setting mechanism is configured to release and adjust the first claw piece from the first fixed mounting position to a second fixed mounting position relative to the locking mechanism in a second state of use, and
   wherein, when the second claw piece is in the closed position, the initial closed predetermined clearing width in the first state of use is different than the second closed predetermined clearing width in the second state of use.

9. The brake disk lock according to claim 8, wherein the brake disk lock comprises a holder which supports the locking mechanism, and wherein the first claw piece is fixedly mounted relative to the holder at the first and second mounting positions.

10. The brake disk lock according to claim 8, wherein the first and second fixed mounting positions are each one of multiple different mounting positions, wherein the adjustable range setting mechanism comprises an engagement contour associated with the locking mechanism and an engagement counter-contour associated with the first claw piece, and wherein the engagement contour and the engagement counter-contour are brought into engagement with each other in the different mounting positions of the first claw piece and are secured to each other in the respective mounting position to selectively define the initial or second closed predetermined clearing width.

11. The brake disk lock according to claim 8, wherein the first claw piece is configured as rigid and/or comprises a fixed length.

12. The brake disk lock according to claim 1, wherein the adjustable range setting mechanism is only adjustable when the locking mechanism is in an unlocked position, in order to access the adjustable range setting mechanism to adjust the initial or second closed predetermined clearing width of the claw pieces to different brake disks.

13. The brake disk lock according to claim 1, wherein the adjustable range setting mechanism comprises a securing element which is configured to secure an adjustment of the initial or second closed predetermined clearing width of the claw pieces, and wherein the securing element is at least one of:
   covered by the brake disk or by a part of the brake disk lock; or
   blocked against movement,
when the brake disk lock is mounted at the brake disk and when the claw pieces are closed and locked.

14. The brake disk lock according to claim 1, wherein the claw pieces are biased towards the open position.

15. The brake disk lock according to claim 1, wherein the locking mechanism comprises a latch that in a locking position, when the claw pieces are closed, locks the second claw piece to the first claw piece and, in a release position, releases the second claw piece for movement relative to the first claw piece.

16. The brake disk lock according to claim 15, wherein the latch has a latch bias and is biased towards the locking position of the latch, and wherein, during a movement of the claw pieces from the open position to the closed position, the latch is configured to be first temporarily urged back towards the release position of the latch against the latch bias due to the movement of the claw pieces from the open position to the closed position, and wherein the latch subsequently snaps back into the locking position due to the latch bias.

17. The brake disk lock according to claim 15, wherein the latch is rotatably mounted and comprises a peripheral surface with a tangential recess, and wherein the tangential recess releases a locking protrusion of the second claw piece in the release position of the latch to allow the second claw piece to move from the closed position to the open position, wherein the latch blocks the locking protrusion and the second claw piece from moving to the open position when the latch is in the locking position.

18. The brake disk lock according to claim 1, wherein at least one of the claw pieces is configured to engage in an opening of the brake disk and thereby hold the brake disk lock suspended at the brake disk.

19. The brake disk lock according to claim 1, wherein the brake disk lock comprises an alarm device for outputting an alarm signal, and wherein the alarm device is configured to be activated by moving the claw pieces to the closed position and to be deactivated by moving the claw pieces from the closed position to the open position.

20. The brake disk lock according to claim 19, wherein the alarm device comprises an activation switch which is configured to be automatically actuated in the closed position by the second claw piece or by a part of the brake disk lock connected to the second claw piece.

21. The brake disk lock according to claim 19, wherein the alarm device is arranged in a housing section of the brake disk lock which is fixedly connected to the first claw piece, wherein the alarm device is only accessible as a result of an unlocking of the locking mechanism.

22. The brake disk lock according to claim 1, wherein the brake disk lock comprises a first securing section associated with the first claw piece and a second securing section associated with the second claw piece, wherein, in the open position of the claw pieces, the first securing section and the second securing section form a receiving opening for the insertion of an eyelet of a flexible securing member, and wherein, in the closed position of the claw pieces, the first securing section and the second securing section form a circumferentially closed boundary of the receiving opening for securing the inserted eyelet at the brake disk lock.

23. The brake disk lock according to claim 1,
   wherein in a repeated locking of the brake disk lock at the brake disk and releasing the brake disk lock from the brake disk the initial or second closed predetermined clearing width is maintained as set by the adjustable range setting mechanism.

* * * * *